April 22, 1941.   W. ERNST   2,239,148
FLUID PRESSURE RELIEF OR UNLOADING VALVE
Filed June 10, 1938
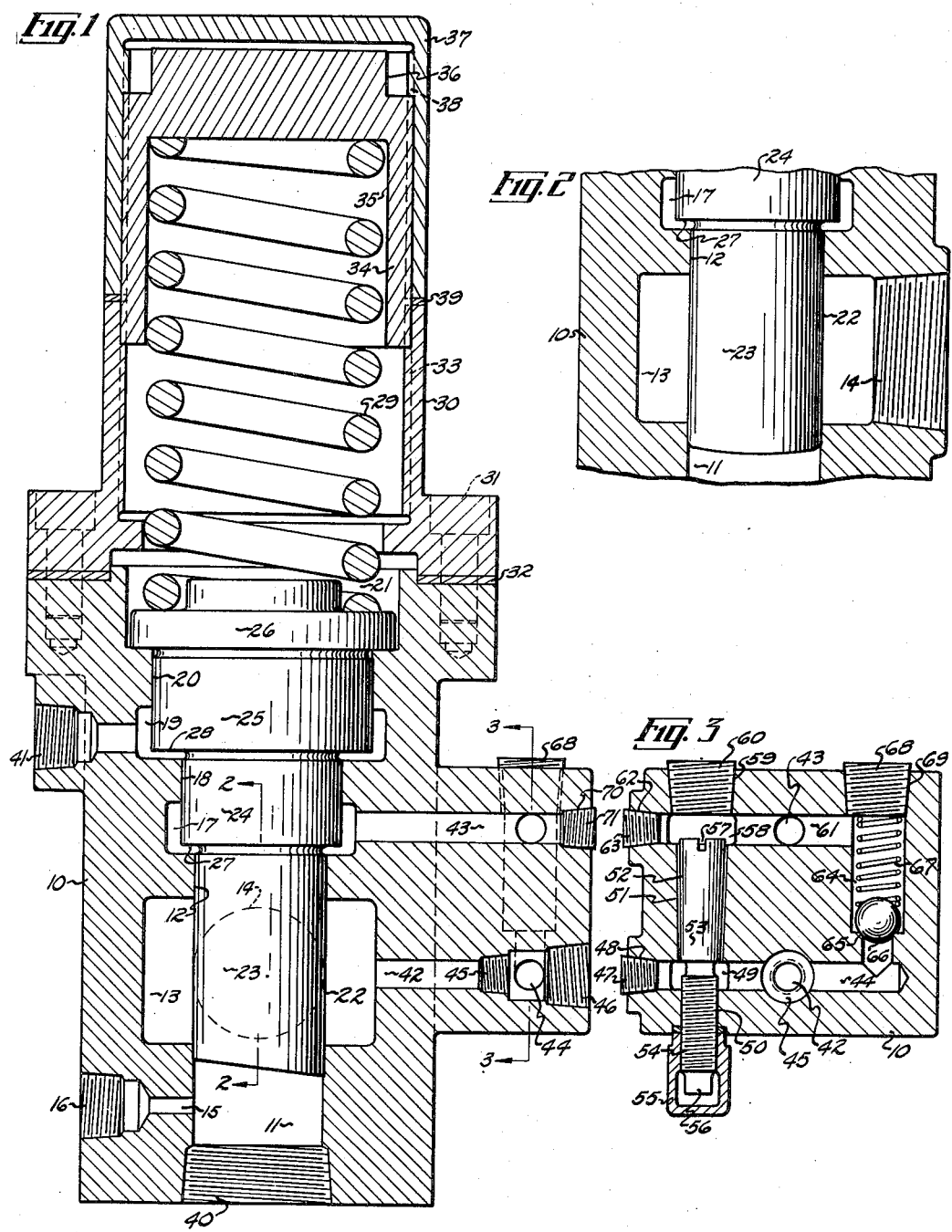
INVENTOR
WALTER ERNST
BY
ATTORNEY Patented Apr. 22, 1941

2,239,148

UNITED STATES PATENT OFFICE 2,239,148

FLUID PRESSURE RELIEF OR UNLOADING VALVE

Walter Ernst, Mount Gilead, Ohio, assignor to The Hydraulic Development Corporation, Inc., Wilmington, Del., a corporation of Delaware Application June 10, 1938, Serial No. 213,031

8 Claims. (Cl. 137—153)

This invention relates to hydraulic machinery and, in particular, to relief or unloading valves.

One object of this invention is to provide a relief or unloading valve which is adapted, at the will of the operator, to be used for either purpose.

Another object is to provide a relief or unloading valve which may be used as a relief valve actuated by the pressure in the line which is relieved, or as an unloading valve actuated by the pressure within a line or pressure chamber other than the line which is relieved.

Another object is to provide a relief or unloading valve of the type described immediately above, wherein the valve may be used as a single pilot unloading valve actuated by the pressure within a line or pressure chamber other than the one which is relieved, or which may be used as a double pilot unloading valve actuated by either of two separate lines or pressure chambers, other than the one which is relieved.

Another object is to provide a relief or unloading valve having provision therein for preventing the "chatter" or vibration of the valve plunger.

In the drawing:

Figure 1 is a central vertical section through a preferred embodiment of the relief or unloading valve of this invention;

Figure 2 is a vertical section along the line 2—2 in Figure 1; and

Figure 3 is a vertical section along the line 3—3 in Figure 1.

Referring to the drawing in detail, Figure 1 shows the preferred embodiment of the valve of this invention as consisting of a casing 10 having lower bores 11 and 12 with an annular chamber 13 therebetween, admission to which is gained by means of the threaded port 14. Opening into the bore 11 is a transverse passageway 15 having a port 16 at the entrance thereto.

Above the bores 11 and 12 and coaxial therewith is an annular chamber 17, above which is an enlarged bore 18 terminating in an annular chamber 19. Above the annular chamber 19 is a further enlarged bore 20 which opens into the spring chamber 21. Reciprocable within the above-mentioned bores in the valve casing 10 is a valve plunger, generally designated 22, having a lower portion 23, an enlarged mid-portion 24 and a still further enlarged upper portion 25 terminating in a head 26.

By this construction, the annular area 27 between the plunger portions 23 and 24 forms a piston area within the annular chamber 17, whereas the similar annular area 28 between the middle portion 24 and upper portion 25 thereof forms an annular piston area within the upper annular chamber 19. Engaging the head 26 of the valve plunger 22 is a coil spring 29 contained within a spring casing 30 secured to the valve casing 10 by means of the screws 31 and having a gasket 32 therebetween to prevent leakage. The interior of the spring casing 30 is threaded as at 33 to receive a hollow threaded plug 34 within the socket 35, into which the upper end of the coil spring 29 is received.

The plug 34 terminates in a head 36 which may be square or hexagonal in order to receive a wrench or other handle. Secured to the threaded plug 34 and threaded downwardly thereon is a hollow threaded cap 37 having a threaded portion 38 therein. The cap 37 serves as a cover for the threaded plug 34 and is screwed down against the spring casing 30 with a gasket 39 therebetween to prevent leakage.

Communication with the lowermost bore 11 is obtained by means of the threaded port 40, and that with the upper chamber 19 by means of the threaded port 41. Access to the chambers 13 and 17 respectively is obtained through the transverse passages 42 and 43 respectively. The passageway 42 opens into a lateral passageway 44 (Fig. 3) and has threaded portions 45 and 46 on opposite sides thereof for the reception either of the ends of pipes or of pipe plugs. The bore 44 at one end is closed by the plug 47 in the threaded port 48, and adjacent thereto is an annular chamber 49. A threaded bore 50 passes downwardly from the latter, whereas a conically tapered bore 51 proceeds upwardly therefrom (Fig. 3).

Arranged within these bores 50 and 51 is a tapered plug 52 having its tapered portion 53 engaging the tapered bore 51 and the threaded portion 54 engaging the threaded bore 50. A threaded cap 55 is threaded upon the threaded portion 54 externally of the casing 10 and serves to cover up the squared end 56, by which the threaded plug 52 is rotated as by a wrench. The upper end of the tapered portion 53 is provided with a slot 57, into which a screw driver may be inserted for the adjustment of the tapered plug 52, if this means is preferred instead of using a wrench upon the squared head 56. The tapered bore 51 opens into a chamber 58, from which a threaded port 59 closed by a threaded plug 60 leads to the outside atmosphere.

Running from the chamber 58 to and past the passage 43 is a passage or bore 61. One end of the latter terminates in a threaded port 62 closed by a plug 63, whereas the opposite end terminates in a vertical bore 64 leading downwardly to the passageway 44 and having a valve seat 65, against which a ball 66 is urged as by the coil spring 67 seated against the threaded plug 68 in the tapered port 69.

The passageway 43 terminates at its outer end in a threaded port 70 closed by a threaded plug 71 (Fig. 1).

Operation as a relief valve

When the valve is operated as a relief valve, the ports 16 and 41, at the lefthand side of Figure 1, are connected by external piping. Any leakage from the middle chamber 17 into the upper chamber 19 can then drain away into the exhaust port 40 and bore 11 by way of the passageway 15. When the valve is so arranged and used as a relief valve, pressure fluid enters the lower chamber 13 through the port 14 and fills the passageways 42, 44, 64, 61, 43, and the middle chamber 17. The pressure of the fluid raises the ball 66 from its seat 65 against the urge of the coil spring 67 to accomplish this filling. The pressure fluid reaching the middle chamber 17 acts against the differential piston area 27 between the portions 23 and 24 of the valve plunger 22 and tends to lift the latter against the force of the coil spring 29.

When sufficient pressure has been built up to compress the spring 29, the valve plunger 22 will be lifted, thereby permitting fluid to escape from the lower chamber 13 through the bore 14 and discharge port 40.

In order to prevent "chattering," namely, a rapid reciprocation of the valve plunger 22 when the pressure in the middle chamber 17 suddenly falls with the escape of fluid through the discharge port 40, there is provided the ball check 66 and choke formed between the tapered portion 53 of the tapered plug 52 and the tapered bore 51. The tapered plug 52 is rotated either by a squared portion 56 or by the screw driver slot 57 in order to space the tapered portion 53 slightly away from the walls of the tapered bore 51 for this purpose.

The ball check 66 permits any pressure impulse, however sudden, to enter the middle chamber 17. Once this pressure fluid reaches the middle chamber 17, however, it cannot escape in the reverse direction past the ball check 66, because the latter immediately closes. It can, however, escape more slowly past the restricted annular opening or choke between the tapered portion 53 and the tapered bore 51.

If an excess supply of pressure fluid is not maintained in the lower chamber 13, the fluid in the middle chamber 17 soon escapes past the choke formed between the tapered portion 53 and the tapered bore 51, with the result that the valve plunger 22 moves downwardly and closes the valve. The latter remains closed until another pressure surge is received. This prevents the "chattering" or a continued rise and fall of the plunger 22 as the pressure in the middle chamber 17 falls with the opening of the bore 11 to the discharge port 40, only to be followed by the downward motion of the piston 22 which is, in turn, followed by the rise of the piston 22 as pressure again accumulates in the middle chamber 17.

Hitherto attempts have been made to eliminate this objectionable "chatter" by providing an adjustable choke or restricted opening in the passageway drilled in the valve plunger. This relieved the "chatter" condition to some extent, but made the valve somewhat unreliable in operation, because pressure surges could not act instantly against the valve plunger, but required a definite time lag for passing through the choke. The result was that breakage frequently occurred in some part of the equipment which was supposed to be protected by the valve. Again, it was found in such valves that a foreign substance would frequently clog the choke with the result that the valve became completely inoperative and damage resulted.

The present construction, however, eliminates the "chattering" without these disadvantages. In this manner, therefore, the valve shown in Figures 1 to 3 may be used as a relief valve actuated by the pressure in the line which is relieved.

Operation as a single pilot unloading valve

When the valve of this invention is to be employed as a single pilot unloading valve to be actuated by the pressure within a line or pressure chamber other than the one which is relieved, the ports 41 and 16 are again interconnected by external piping for handling leakage from the middle chamber 17 to the upper chamber 19 in the manner previously described. The pilot line or line from the pressure source which is to actuate the unloading valve is connected to the threaded port 46 in the lower righthand corner of Figure 1.

Let is be assumed then, the valve so arranged is connected in a circuit containing a hydraulic machine such as a hydraulic press operated by two pumps, one a high pressure pump and the other a low pressure pump. The unloading valve of the invention is connected with its ports 14 and 40 and chamber 13 in the low pressure pump delivery line, and the pilot line leading to the main cylinder of the press is connected to the lower threaded port 46.

In the operation of this circuit, both the low pressure and high pressure pumps deliver fluid to the main cylinder of the press until a predetermined pressure is reached. This pressure fluid passes through the pilot line, the port 46, the passages 44, 64, 61 and 43 and past the ball check 66 into the middle chamber 17, where it acts against the annular piston area 27 to raise the valve plunger 22 against the contrary urge of the coil spring 29.

When the valve plunger 22 is raised, the discharge of the pressure fluid from the low pressure pump passes through the port 14 and the lower chamber 13 into the lowermost bore 11 and escapes through the threaded port 40, to which the exhaust line is connected. As long as a sufficiently high pressure exists in the main cylinder, therefore, this pressure will act against the annular piston area 27 to maintain the valve plunger 22 in its raised position, thereby holding the valve open and maintaining the low pressure pump in a by-passed condition by way of the lower chamber 13 and exhaust port 40. In this manner, the discharge of pressure fluid from the low pressure pump is by-passed through the valve as long as a predetermined high pressure exists in the main cylinder.

Operation as a double pilot unloading valve

When the valve of this invention is used as a double pilot unloading valve, it is actuated by pressure within either of two separate lines or pressure chambers other than the one which is relieved. For this purpose, threaded plugs are inserted in the threaded ports 45 and 16. The port 46 is connected to one pilot line and the port 41 to a second pilot line. This arrangement may be used, for example, in connection with a press having a main chamber and a pull-back chamber, one pilot line being connected to each chamber.

This is done, because it may be advisable to unload the low pressure pump during the retraction stroke of the press, an operation which cannot be performed by the single pilot unloading valve described previously, because its single pilot line is connected to the pressure side of the main ram and hence is not subject to pressure during the retraction stroke of the press. The second pilot line running from the pull-back cylinders to the threaded port 41, however, takes care of this difficulty by acting within the upper chamber 19 against the annular piston area 28 to raise the valve plunger 22 when the pressure during the pull-back stroke of the press reaches a predetermined amount. As the pull-back pressure is usually considerably lower than the pressure existing in the main cylinder during the pressing stroke, a larger piston area is provided at 28 than at 27 so that the unloading valve is operated at a lower pressure on the retraction stroke of the press than on the main or pressing stroke thereof.

Since the chambers 19 and 17 are not under pressure at the same time, because their ports 41 and 46 are likewise not under pressure at the same time, any leakage from the upper chamber to the middle chamber 17 escapes through the passageways 43 and 61, the choke passageway between the tapered plug 52 and the tapered bore 51 and the port 46. Any leakage from the upper chamber 19 into the spring casing 30 may be drained into the discharge port 40 by way of a longitudinal bore through the entire valve plunger 22 running from one end to the other (not shown).

It will be understood that I desire to comprehend within my invention such modifications as come within the scope of the claims and the invention.

Having thus fully described my invention, what I claim as new and desire to secure by Letters Patent is:

1. In a valve, a casing having a bore with a main valve chamber and a pair of separate spaced plunger-lifting chambers aligned therewith, one of said plunger lifting chambers being adapted to communicate with one fluid pressure line, and the other of said fluid lifting chambers being adapted to communicate with another fluid pressure line and a valve plunger with portions of three different diameters mounted for reciprocation in said bore, said plunger portions cooperating to form a pair of annular piston areas disposed in said pair of separate plunger-lifting chambers respectively, said main valve chamber having an inlet and discharge port communicating therewith.

2. In a valve, a casing having a bore with a main valve chamber and a pair of separate spaced plunger-lifting chambers aligned therewith and adapted respectively to communicate with two different fluid pressure lines, a valve plunger with portions of three different diameters mounted for reciprocation in said bore, said plunger portions cooperating to form a pair of annular piston areas respectively disposed in said pair of separate plunger-lifting chambers so that one annular piston area is responsive to a predetermined pressure in one of said two fluid pressure lines, and the other annular piston area is responsive to a different pressure in the other of said two fluid pressure lines for operating said plunger, said main valve chamber having an inlet and discharge port communicating therewith, a connecting conduit connecting said main valve chamber with one of the plunger-lifting chambers, and unidirectional valve means in said connecting conduit.

3. In a valve, a casing having a bore with a main valve chamber and a pair of separate spaced plunger-lifting chambers aligned therewith and adapted respectively to communicate with two different fluid pressure lines, a valve plunger with portions of three diameters mounted for reciprocation in said bore, said plunger portions cooperating to form a pair of annular piston areas which are respectively disposed in said pair of separate plunger-lifting chambers and one of which is responsive to a predetermined pressure in one of said two fluid pressure lines whereas the other of said piston areas is responsive to a different pressure in the other of said fluid pressure lines, for operating said plunger, said main valve chamber having an inlet and discharge port communicating therewith, a connecting conduit connecting said main valve chamber with one of the plunger-lifting chambers, unidirectional valve means in said connecting conduit, a by-pass conduit around said unidirectional valve means, and fluid flow restricting means within said by-pass conduit.

4. In a valve, a casing having a bore with a main valve chamber and a pair of separate spaced plunger-lifting chambers aligned therewith and adapted respectively to communicate with two different fluid pressure lines, a valve plunger with portions of three diameters mounted for reciprocation in said bore, said plunger portions cooperating to form a pair of annular piston areas which are respectively disposed in said pair of separate plunger-lifting chambers and one of which is responsive to a predetermined pressure in one of said two fluid pressure lines whereas the other of said piston areas is responsive to a different pressure in the other of said fluid pressure lines, for operating said plunger, said main valve chamber having an inlet and discharge port communicating therewith, a connecting conduit connecting said main valve chamber with one of the plunger-lifting chambers, and a check valve in said connecting conduit.

5. In a valve, a casing having a bore with a main valve chamber and a pair of separate spaced plunger-lifting chambers aligned therewith and adapted respectively to communicate with two different fluid pressure lines, a valve plunger with portions of three diameters mounted for reciprocation in said bore, said plunger portions cooperating to form a pair of annular piston areas which are respectively disposed in said pair of separate plunger-lifting chambers and one of which is responsive to a predetermined pressure in one of said two fluid pressure lines whereas the other of said piston areas is responsive to a different pressure in the other of said fluid pressure lines, for operating said plunger, said main valve chamber having an inlet and discharge port communicating therewith, a connecting conduit connecting said main valve chamber with one of the plunger-lifting chambers, a check valve in said connecting conduit, a by-pass conduit around said check valve, and a choke within said by-pass.

6. In a valve, a casing having a bore with a main valve chamber and a pair of separate spaced plunger-lifting chambers aligned therewith and adapted respectively to communicate with two different fluid pressure lines, a valve plunger with portions of three diameters mounted for reciprocation in said bore, said plunger portions cooperating to form a pair of annular piston areas which are respectively disposed in said pair of separate plunger-lifting chambers and one of which is responsive to a predetermined pressure in one of said two fluid pressure lines whereas the other of said piston areas is responsive to a different pressure in the other of said fluid pressure lines, for operating said plunger, said main valve chamber having an inlet and discharge port communicating therewith, a connecting conduit connecting said main valve chamber with one of the plunger-lifting chambers, a check valve in said connecting conduit, a by-pass conduit around said check valve, and a choke within said by-pass, said choke comprising a tapered by-pass bore and a tapered member arranged in spaced relationship therewith.

7. In a valve, a casing having a bore with a main valve chamber and a pair of separate spaced plunger-lifting chambers aligned therewith and adapted respectively to communicate with two different fluid pressure lines, a valve plunger with portions of three diameters mounted for reciprocation in said bore, said plunger portions cooperating to form a pair of annular piston areas which are respectively disposed in said pair of separate plunger-lifting chambers and one of which is responsive to a predetermined pressure in one of said two fluid pressure lines whereas the other of said piston areas is responsive to a different pressure in the other of said fluid pressure lines, for operating said plunger, said main valve chamber having an inlet and discharge port communicating therewith, a connecting conduit connecting said main valve chamber with one of the plunger-lifting chambers, unidirectional valve means in said connecting conduit, a by-pass conduit around said unidirectional valve means, and fluid flow restricting means within said by-pass conduit, said connecting conduit and said by-pass conduit comprising bores within said casing and communicating with bores leading respectively to said chambers.

8. In a valve, a casing having a bore with a main valve chamber and a pair of separate spaced plunger-lifting chambers aligned therewith and adapted respectively to communicate with two different fluid pressure lines, a valve plunger with portions of three diameters mounted for reciprocation in said bore, said plunger portions cooperating to form a pair of annular piston areas which are respectively disposed in said pair of separate plunger-lifting chambers and one of which is responsive to a predetermined pressure in one of said two fluid pressure lines whereas the other of said piston areas is responsive to a different pressure in the other of said fluid pressure lines, for operating said plunger, said main valve chamber having an inlet and discharge port communicating therewith, a connecting conduit connecting said main valve chamber with one of the plunger-lifting chambers, unidirectional valve means in said connecting conduit, a by-pass conduit around said unidirectional valve means, fluid flow restricting means within said by-pass conduit, and yielding means for urging said valve plunger oppositely to the urge imparted thereto by said piston areas.

WALTER ERNST.